US012785104B2

(12) United States Patent
Hansen

(10) Patent No.: US 12,785,104 B2
(45) Date of Patent: Nov. 3, 2026

(54) NICKEL-COATED FIBER ADDITIVE FOR RESISTANCE REDUCTION IN A BATTERY AND BATTERY MATERIALS

(71) Applicant: George Clayton Hansen, Midway, UT (US)

(72) Inventor: George Clayton Hansen, Midway, UT (US)

(73) Assignee: BATTERY ELECTRON TRANSPORT ASSOCIATES, iNC., Midway, UT (US)

( * ) Notice: Subject to any disclaimer, the term of this patent is extended or adjusted under 35 U.S.C. 154(b) by 781 days.

(21) Appl. No.: 18/079,806

(22) Filed: Dec. 12, 2022

(65) Prior Publication Data

US 2023/0170486 A1 Jun. 1, 2023

Related U.S. Application Data

(63) Continuation-in-part of application No. 17/340,063, filed on Jun. 6, 2021, now Pat. No. 11,527,756.

(60) Provisional application No. 63/038,864, filed on Jun. 14, 2020.

(51) Int. Cl.

| | |
|---|---|
| ***H01M 4/62*** | (2006.01) |
| ***H01M 4/136*** | (2010.01) |
| ***H01M 4/58*** | (2010.01) |
| *H01M 4/02* | (2006.01) |

(52) U.S. Cl.

CPC ........... *H01M 4/626* (2013.01); *H01M 4/136* (2013.01); *H01M 4/5825* (2013.01); *H01M 4/625* (2013.01); *H01M 2004/021* (2013.01); *H01M 2004/028* (2013.01)

(58) Field of Classification Search

CPC .... H01M 4/625; H01M 4/626; H01M 4/5825; H01M 4/136; H01M 2004/028; H01M 2004/021

See application file for complete search history.

(56) References Cited

U.S. PATENT DOCUMENTS

| | | | |
|---|---|---|---|
| 5,747,195 | A | 5/1998 | Alamgir et al. |
| 5,766,789 | A | 6/1998 | James et al. |
| 5,856,043 | A | 1/1999 | Ohsaki et al. |
| 6,143,445 | A | 11/2000 | Ferment et al. |

(Continued)

FOREIGN PATENT DOCUMENTS

| | | |
|---|---|---|
| EP | 1016156 B1 | 8/2003 |
| JP | 2004335186 | 11/2004 |

(Continued)

OTHER PUBLICATIONS

Nathan Hansen, et al., Quantitative methods for correlating dispersion and electrical conductivity in conductor-polymer nano-strand composites, Nov. 2012, ScienceDirect, vol. 43, Issue 11, pp. 1939-1946, sciencedirect.com/science/article/abs/pii/S1359835X12001790.

(Continued)

*Primary Examiner* — Laura Weiner

(74) *Attorney, Agent, or Firm* — Madson IP, P.C.

(57) ABSTRACT

The electrical resistance of active cathodic and anodic films may be significantly reduced by the addition of small fractions of conductive additives within a battery system. The decrease in resistance in the cathode and/or anode leads to easier electron transport through the battery, resulting in increases in power, capacity and rates while decreasing joules heating losses.

8 Claims, 8 Drawing Sheets

(56) References Cited

U.S. PATENT DOCUMENTS

| | | | |
|---|---|---|---|
| 6,335,120 | B1 | 1/2002 | Bernard et al. |
| 6,485,865 | B1 | 11/2002 | Sugikawa |
| 9,356,320 | B2 | 5/2016 | Shih et al. |
| 2003/0036001 | A1 | 2/2003 | James et al. |
| 2004/0248006 | A1 | 12/2004 | Tsutsumi et al. |
| 2006/0134525 | A1 | 6/2006 | Kleijnen et al. |
| 2007/0122687 | A1 | 5/2007 | Sakurai et al. |
| 2007/0207388 | A1 | 9/2007 | Okuno et al. |
| 2008/0145755 | A1 | 6/2008 | Tacovangelo et al. |
| 2009/0053608 | A1 | 2/2009 | Choi et al. |
| 2011/0151328 | A1 | 6/2011 | Chang et al. |
| 2013/0143087 | A1 | 6/2013 | Liu et al. |
| 2013/0224603 | A1 | 8/2013 | Chen et al. |
| 2015/0099185 | A1 | 4/2015 | Joo et al. |
| 2016/0301096 | A1 | 10/2016 | Zhamu et al. |
| 2016/0351973 | A1 | 12/2016 | Albano et al. |
| 2017/0098856 | A1 | 4/2017 | Zhamu et al. |
| 2018/0006330 | A1 | 1/2018 | Zhu et al. |
| 2018/0212250 | A1 | 7/2018 | Zhamu et al. |
| 2018/0219214 | A1 | 8/2018 | Zhamu et al. |
| 2018/0294474 | A1 | 10/2018 | Zhamu et al. |
| 2019/0207200 | A1 | 7/2019 | Zhamu et al. |
| 2019/0386337 | A1 | 12/2019 | Zhamu et al. |
| 2020/0052290 | A1 | 2/2020 | He et al. |
| 2020/0243841 | A1 | 7/2020 | Yang et al. |
| 2021/0020907 | A1 | 1/2021 | Kim et al. |
| 2021/0391581 | A1 | 12/2021 | Hansen |
| 2023/0064149 | A1 | 3/2023 | Hansen |

FOREIGN PATENT DOCUMENTS

| | | |
|---|---|---|
| JP | 2017063041 | 3/2017 |
| KR | 1019990063787 | 7/1999 |
| KR | 101628901 | 6/2015 |
| KR | 102016122525 | 10/2016 |
| WO | 2017013827 | 1/2017 |

OTHER PUBLICATIONS

Max Alexander, Newly Developed Nickel Nanostrands Increase Conductivity in Existing Materials, Feb. 8, 2013, wpafb.af.mil/NEWS/Article-Display/Article/399418/newly-developed-nickel-nanostrands-increase-conductivity-in-existing-materials/.

Michael Koecher, et al., Characterization of nickel nanostrand nanocomposites through dielectric spectroscopy and nanoindentation, Apr. 13, 2013, https://doi.org/10.1002/pen.23511.

Conductive Composites, Nanostrands, Aug. 4, 2020, Conductive Composites product sheet M-003.

Yiping Tang, et al., Froth floatation integrated into electrodeposition to prepare Ni/short carbon fibers composites with network and sheet structures, Science Direct, available online Jul. 25, 2006 at www.sciencedirect,com, Materials Letters 61 (2007) 1307-1310.

Zhongsheng Hua, et al., Preparation and Characterization of Nickel-Coated Carbon Fibers by Electroplating, Journal of Materials Engineering and Performance, vol. 21(3) Mar. 2012, pp. 324-330.

Sheng-Wen Zhu, et al., Effects of Fibrous Nickel Additives on the Electrochemical Properties of LiFePO4 Cathode for Lithium-ion Battery, Int. J. Electrochem. Sci., published Nov. 4, 2015, pp. 10597-10606.

NICKEL-COATED FIBER ADDITIVE FOR RESISTANCE REDUCTION IN A BATTERY AND BATTERY MATERIALS

RELATED APPLICATION

This patent application is a continuation-in-part of U.S. patent application Ser. No. 17/340,063 filed Jun. 6, 2021, now U.S. Pat. No. 11,527,756, for an invention titled RESISTANCE REDUCTION IN A BATTERY AND BATTERY MATERIALS which claimed the benefit of U.S. Provisional Patent Application Ser. No. 63/038,864 that was filed on Jun. 14, 2020, for an invention titled RESISTANCE REDUCTION IN BATTERY MATERIALS, which both are incorporated herein by this reference.

BACKGROUND OF THE INVENTION

1. Field of the Invention

The present invention relates to increasing the conductivity of battery cathodes and anodes to enhance battery performance. More specifically, the present invention relates to methods and systems for enhancing the performance of batteries by lowering the electrical resistance both across and particularly through the active films, thus increasing conductivity to increase discharge and charge rates, and ultimately to increase both power and energy density.

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "some embodiments," "various embodiments," and the like, may indicate that the embodiment(s) of the invention so described may include a particular structure, feature, property, or characteristic, but not every embodiment necessarily includes the particular structure, feature, property, or characteristic. Further, repeated use of the phrase "in one embodiment," or "in an exemplary embodiment," does not necessarily refer to the same embodiment, although they may.

In an energy starved world, we know how to harvest, transport, and use electrical energy. But there is a significant gap in our ability to store electrical energy. Without significant advancements in the ability to store electrical energy, it is likely that renewable energy may always be relegated to a second position to other sources of electrical energy, due to the non-reliability of brittleness of the coating may be prone to flaking off when used in batteries that require robustness or the thickness of the coating may add undesired weight or size to the battery.

Electrical conductivity measurements for both the electroplated fiber and CVD fiber show them to be of similar conductivity.

| Cathode type | Cathode weight | CVR (ohm-cm) | IR (ohm-cm) |
|---|---|---|---|
| Control- no fibers | 130 | 34 | 49 |
| Nickel coated fibers electroplated | 129 | 11 | 0.35 |
| Nickel coated fibers CVD | 138 | 16 | 1.6 |

Depositions formed by vacuum coating processes are not uniform, and the lack of uniformity inhibits optimal conductivity enhancement. For example, sputtered coatings show a "half-moon" of coating on opposite sides of each fiber, thus being very non-uniform. Sputtered coatings, however, still may be used to enhance conductivity in batteries that do not require the level of enhancement provided by uniform coatings. But if they could be made uniform, fibers coated using vacuum coating processes may be an attractive option for certain battery designs.

Alternatives to nickel-coated fibers are available for enhancing conductivity. For example, copper is five times as conductive as nickel. The deposition of copper onto fibers by both electroplating and chemical vapor deposition have been demonstrated, though the electroplating process is far more mature. Copper-coated PCF is an excellent alternative.

Additionally, chemical vapor deposition of aluminum is a process by which aluminum-coated fibers may be used to enhance conductivity. However, there is no viable wet process for coating aluminum, but there is a similar molten bath dip process that provides a complete coating. The thickness and uniformity of the coating is difficult to achieve. Nevertheless, such aluminum-coated fibers may also provide enhanced conductivity for certain battery designs.

Other parameters have significance. For example, the choice of fiber (substrate) and the choice of metal (coating) must also be compatible with the chemistry of the battery system. The galvanic corrosion potential of the metal-coating with respect to the chosen ionic electrolyte must be greater than the operating voltage of the battery, for if it is less, it will prematurely galvanically corrode, as discussed herein. Additionally, the volume resistivity of the coated fiber must be less than that of the active film. The wider this improvement is, the greater the increase in performance. The length of the fiber also has importance. Fibers may be cut to very precise and consistent lengths, ranging from 0.1 mm to 1.0 mm to facilitate dispersibility. In addition, fibers also may be cut precisely to traditional lengths of several mm.

Dispersion efforts show that the precision consistency of fiber length greatly reduces the loading of fiber required for a desired conductivity, thereby reducing viscosity and dispersion issues. However, at concentrations high enough to achieve the desired conductivity, fibers that are above 1 mm in length may become entangled and may not disperse well. At the other end of the length spectrum, fibers that are 0.1 mm in length disperse very well, but their shorter aspect ratio mandates that higher loading is required for a desired conductivity. This added material loading adds weight and cost, but more importantly, displaces active battery materials, thereby commensurately reducing the available capacity.

The use of 0.5 mm fibers or fibers of about 0.5 mm are particularly suitable for dispersion, and that length may be adjusted upward or downward from 0.5 mm depending on other factors such as diameter or to facilitate dispersion. There is a tradeoff between fiber length and loading. Fibers of 1.0 mm are very conductive but can be too long to disperse well into certain materials. Fibers of 0.10 mm disperse well in most materials, but a higher loading is required that may displace precious active battery material. Example #9, below, details some tradeoffs of 0.50 mm vs 0.25 mm fibers. Metal-coated fibers having a diameter of from 3 microns to 20 microns with metal coating thickness between 0.1 microns and 3 microns are particularly suitable for dispersion within cathode and anode materials. Although fibers, produced by any known means, may vary in length within the 0.1 mm to 1 mm range mentioned above, it is preferred to use precision-chopped fibers, wherein precision-chopped fibers means that the fibers are uniformly+10% of the selected length (e.g., for 0.5 mm fibers, all fibers are between 0.45 and 0.55 mm). At that length, fibers may be dispersed in the active anode and cathode materials up to about 10% by weight. But in practice, dispersions above 10% are difficult to achieve. Dispersion loading percentages may be analyzed to determine whether a given loading percentage contributes to conductivity commensurate with the added weight, cost, or displacement of active material. Higher load percentages still may provide enhanced conductivity sufficient to justify use in some battery designs.

Listed below are various examples of metal-coated fiber additive candidates with descriptions of their relative efficacy as additives:

- Carbon fibers—Carbon fibers, in either continuous woven, felt, or a chopped format have been the subject of extensive battery research, as a current collector, support member, or mechanical reinforcement. However, these fibers do not exhibit sufficient conductivity to achieve the desired conductivity enhancement objectives herein.
- Nickel-coated carbon fibers—Nickel-coated carbon fibers are an item of commerce. Their small diameter, low density, high aspect ratio, high linear mass yield, excellent electrical conductivity and environmental stability all combine to provide an excellent conductivity network at very low loadings. However, as the corrosion of nickel against lithium occurs at 3.8 volts, and the lithium NMC cathode operates at 4.2 volts, the nickel on the fiber corrodes at 3.8 volts, and a battery thus made will not cycle, but will fail at 3.8 volts. However, in a lithium iron phosphate (LFP) battery, the maximum voltage is 3.6V, and the operating voltage is closer to 3.2V. Thus (as will be shown in the examples) the nickel-coated fiber works well. For the NMC system, a metal which survives above 3.8V against lithium is required to operate up to 4.2V. Fortunately, aluminum against lithium reacts at 4.7V. Thus, it will be shown in the examples that an aluminum-coated fiber works within a NMC system. As discussed above, the lesson here is that the electrical potential voltage of the conducting metal compared to the electrolyte ion must be above the operating voltage of the element, whether it be the cathode or the anode. Thus, a nickel-coated fiber is predicted to fail in a lithium-ion cathode but succeed in a lithium-ion anode. Such will be the cases illustrated in a few of the examples below. Where cathode operating voltages are low enough, the use of the nickel materials described in this disclosure would be a valid path to reduction in resistivity.
- Aluminum-coated fibers—In a lithium-ion battery, the use of an aluminum-coated fiber is a good choice because the lithium/aluminum reaction occurs at 4.7 volts, and a corrosive reaction will not be reached until 4.7 volts. Using a lithium NMC cathode operating at 4.2 volts will not react corrosively. Additionally, the use of an aluminum-coated fiber is a good choice for an LFP cathode battery because the maximum voltage is 3.6V, and the operating voltage is closer to 3.2V, but the lithium/aluminum reaction occurs at 4.7 volts, and a corrosive reaction will not be reached until 4.7 volts.

To demonstrate that an aluminum-coated fiber additive is a good choice for an LFP cathode battery, a set of LFP cathodes were made with aluminum-coated fibers and a set fabricated with nickel-coated fibers. Fiber length and fiber volume percent added were identical for both sets. A control cathode was made with no added fiber. The CVR (composite volume resistance) and IR (interface resistance) were measured for all three conditions. The results are as follows.

| Cathode type | Cathode weight | CVR (ohm-cm) | IR (ohm-cm) |
|---|---|---|---|
| Control- no fibers | 130 | 34 | 49 |
| Nickel coated fibers | 138 | 18 | 4.8 |
| Aluminum coated fibers | 136 | 16 | 1.6 |

Both metals reduced the CVR by about half, and the IR by an order of magnitude.

Many types of aluminum-coated fiber may be contemplated. Aluminum is coated onto fibers and fabrics usually through a vacuum process or melt process. Applications for these products are usually optical in nature, such as a reflector (optical fibers or mylar balloons) or as a reflector of heat (gloves for high temperature processes). These have been items of commerce for decades. However, these fibers are large in diameter (usually over 25 microns) and have a density of about 2.7 g/cc. Though they could be a viable candidate, their large diameter and moderate density results in a linear yield that is less than desirable.

- Aluminum-coated carbon fiber—As the carbide of aluminum is easily formed, an aluminum-coated carbon fiber is not a viable option.
- Aluminum coating over nickel coating on carbon fiber—If a barrier is placed between the carbon and aluminum, such as a nickel film or coating, the aluminum may be deposited as a thin film over the nickel. This is shown in a successful example below. However, after about a week of cycling, the nickel begins to react with the lithium and the battery fails.
- Aluminum-coating onto other fibers. Any fiber that will not form a carbide during or after deposition is a candidate. Examples that have been demonstrated include silicon carbide, silicate, alumina, aluminum borosilicate, basalt, quartz, aramid, and so forth. Each of these fibers have been demonstrated to readily accept a thin aluminum film, but this list is by no means exhaustive. Hence the fiber (substrate) of an aluminum-coated fiber may be selected from the group including carbon, pan ox, silica, quartz, silicates, alumina, aluminosilicates, borosilicates, glass, minerals, carbides, nitrides, borides, polymers, cellulose, inorganic fibers, and organic fibers.
- Surface modification of carbon fiber. The surface of a carbon fiber may be modified to a silicon carbide, after which the aluminum readily coats onto the silicon carbide surface. This fiber provides the smallest diameter and lowest density approach.
- Other metal-coated fibers-Metal-coated fibers having metal coatings other than nickel or aluminum have been demonstrated as useful, such as copper-coated carbon fibers. See Example #6, below.
- Powders and filamentary branching metals—In the cases where nickel is actively employed for the conductivity, such as in the lithium-ion anode or the LFP cathode, certain types of filamentary nickel powders may act to provide further electrical paths between the metal-coated fibers or act to provide multiple conductive paths through the active mass/polymer/foil current collector interface. The synergistic effects of adding other conductive solid shapes, such as platelets or spheres, are known to increase the interconnectivity between the metal-coated fibers, but not nearly to the extent that filamentary metal powders and structures do. In one particularly advantageous method, nickel powder of a highly filamentary and branched structure, where the main branches of the structure are generally above a micron in diameter, with some branching (such as Inco type 255 powder) may be used. A filamentary branching metal known as "nanostrands" generally has branches below a micron in diameter and exhibits very extensive branching ("nanostrands" are available from Conductive Composites Company of Heber City, Utah).

By using a combination of additives such as metal-coated fiber and a filamentary branching structure such as a branching nickel powder or nanostrands, the metal-coated fiber and the high-aspect ratio, conductive filamentary structures work together to create a comprehensive network of electron transport pathways. The physical nature of metal-coated fibers and the high-aspect ratio, conductive filamentary structure(s) facilitate the creation of an inter-fiber electron transport network for moving electrons between the anode and the current collector interface. The metal-coated fibers act much like logs being elongated linear electron transport conduits and the conductive filamentary structures act much like tumbleweeds that electrically interconnect the logs.

When such a combination of additives is used on the anode, anode conductivity is further enhanced. Whereas the carbon powder of the anode is already somewhat conductive, the spaces between the filamentary network of the conductive filamentary branching structure is about the same dimension and geometry as the carbon powder particle size. Consequently, the filamentary branching structures somewhat three-dimensionally wrap themselves around the carbon particles, like a spider web or a net (hereinafter referred to as a "nanonet"). This "nanonet" phenomenon leads to a much greater level of electrical interconnectivity between the carbon particles, the filamentary branching structures, the metal-coated fibers, and the current collecting foil. This effect is more pronounced for the nanostrands, due to their smaller diameter and larger degree of branching.

Additionally, branching nickel powder and nanostrands may also serve as additives to the anode and/or cathode in battery systems that are nickel compatible. Data is provided below regarding the use of either branching nickel powder or nanostrands as individual additives or in combination with nickel-coated fibers and each demonstrates enhanced conductivity.

Also, the amount of metal coating on the fiber is an important parameter in modifying conductivity, as will be demonstrated in the examples provided below in the Detailed Description.

These and other features of the exemplary embodiments of the present invention will become more fully apparent from the drawings, examples, and the following description, or may be learned by the practice of the invention as set forth hereinafter.

BRIEF DESCRIPTION OF THE DRAWINGS

Exemplary embodiments of the present invention are described more fully hereinafter with reference to the accompanying drawings, in which multiple exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the arrangements disclosed are meant to be illustrative only and not limiting the scope of the invention, which is to be given the full breadth of the appended claims and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items but does not exclude a plurality of items of the list. Additionally, the terms "operator", "user", and "individual" may be used interchangeably herein unless otherwise made clear from the context of the description.

Figure 1:
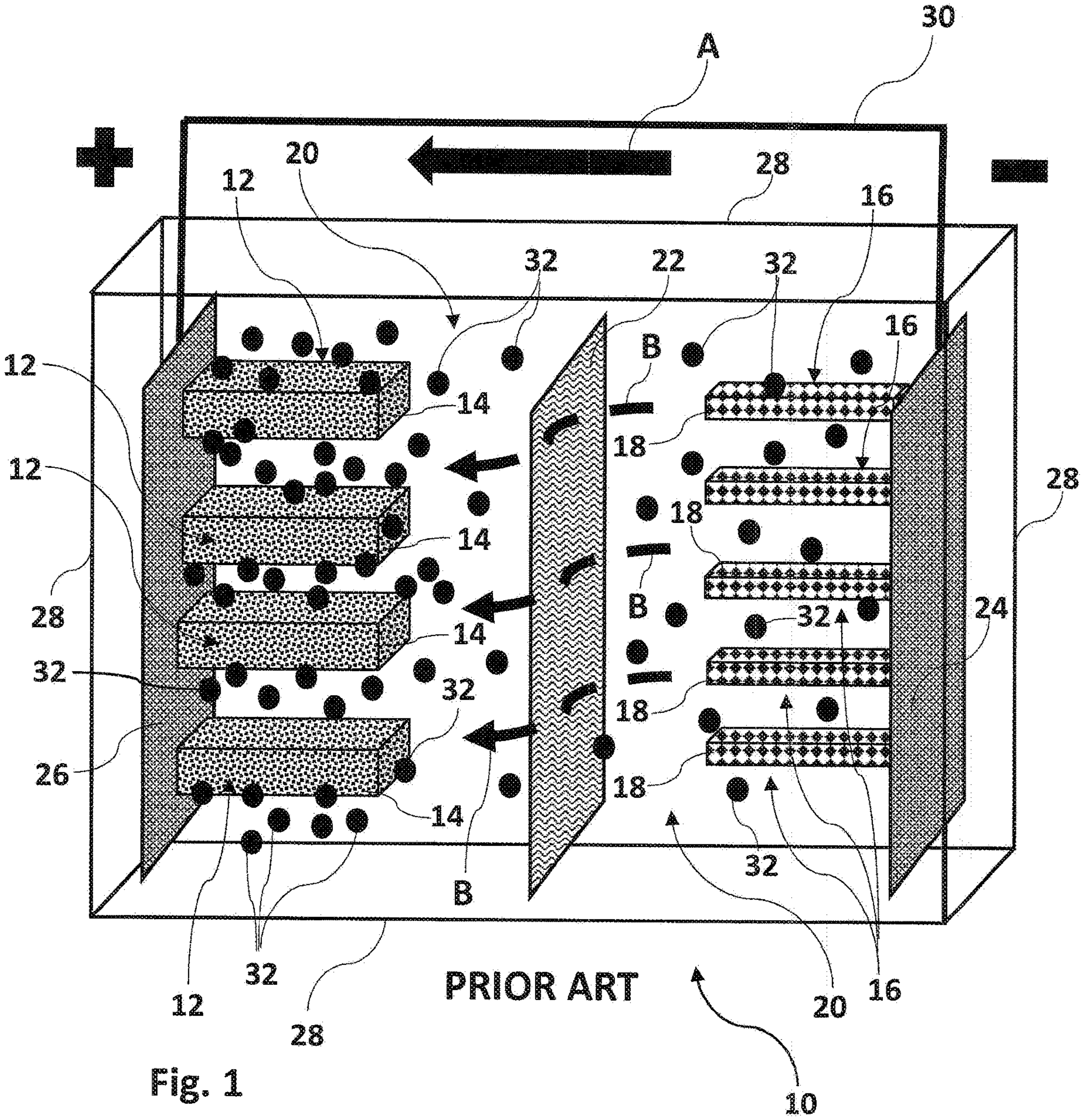

The drawings are schematic depictions of various components and embodiments and are not drawn to scale. Schematic depictions are being used in this application to assist in the understanding of relative relationships between the components. Understanding that these drawings depict only typical exemplary embodiments of the invention and are not therefore to be considered limiting of its scope, the invention will be described and explained with additional specificity and detail with reference to the accompanying drawings in which:

FIG. 1 is a schematic depiction of an exemplary embodiment of a discharging lithium-ion battery as generally known in the prior art.

Figure 2:
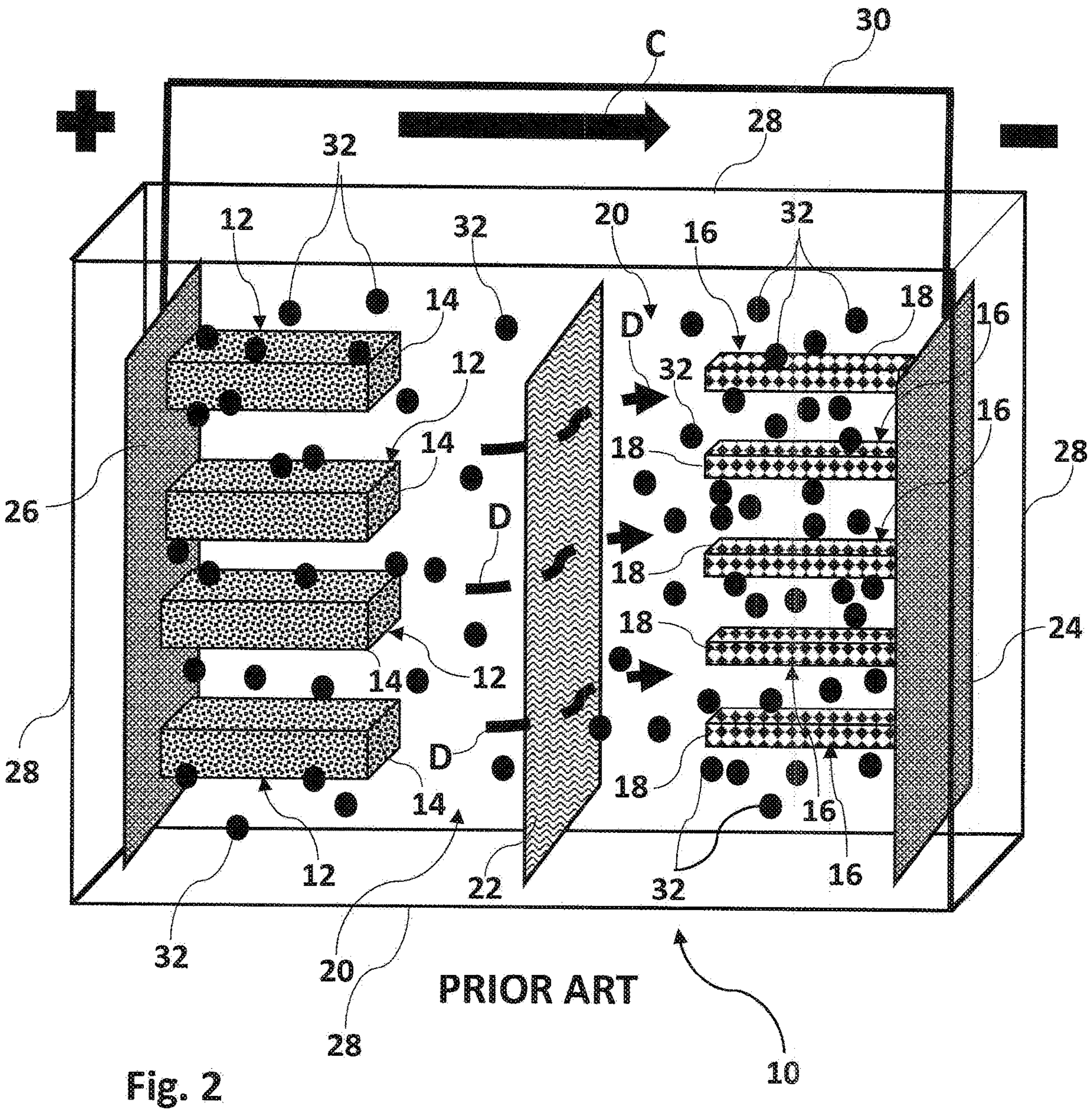
PRIOR ART Fig. 2

FIG. 2 is a schematic depiction of the exemplary embodiment of the lithium-ion battery of FIG. 1 during recharging as generally known in the prior art.

Figure 3:
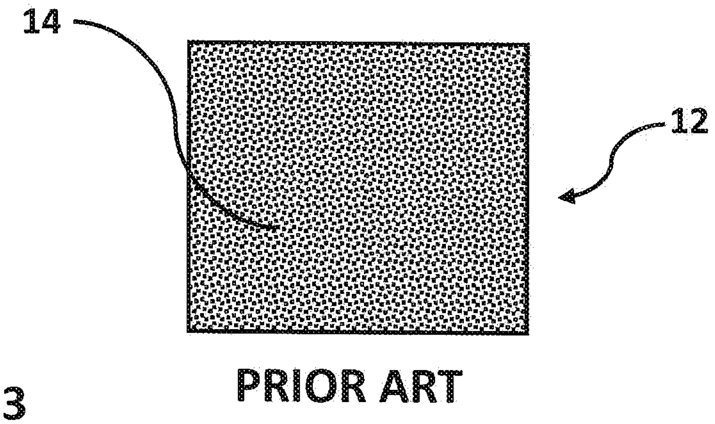

FIG. 3 is a representative depiction of a portion of an exemplary embodiment of a cathode as generally known in the prior art showing an active base cathode material.

Figure 4:
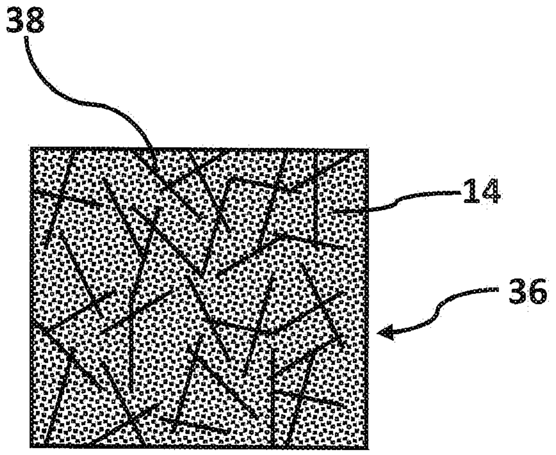

FIG. 4 is a representative depiction of a portion of an exemplary embodiment of an enhanced cathode showing metal-coated fibers dispersed throughout the active base cathode material of FIG. 3.

Figure 5:
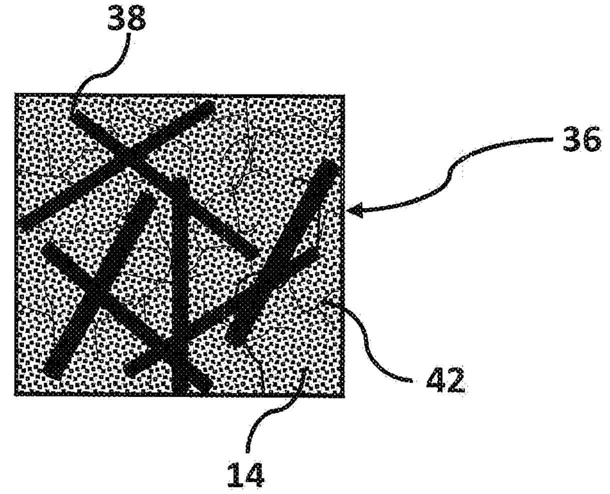

FIG. 5 is a representative depiction of a portion of an exemplary embodiment of an alternative enhanced cathode showing metal-coated fibers and conductive filamentary structures dispersed throughout the active base cathode material of FIG. 3.

Figure 6:
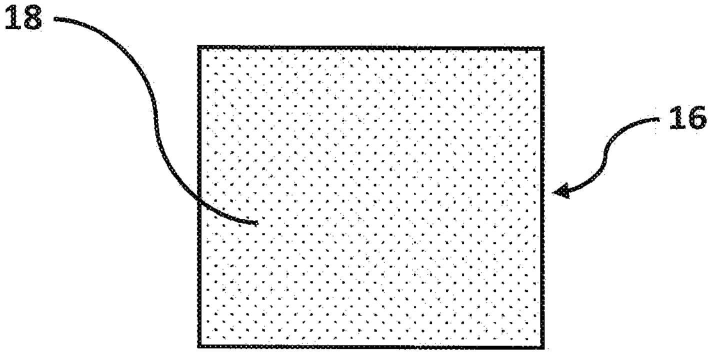
Fig. 6 PRIOR ART

FIG. 6 is a representative depiction of a portion of an exemplary embodiment of an anode as generally known in the prior art showing an active base anode material.

Figure 7:
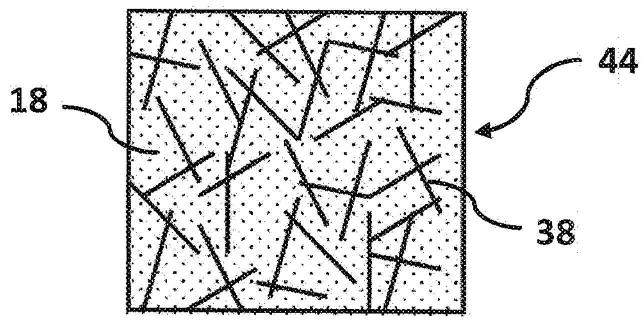

FIG. 7 is a representative depiction of a portion of an exemplary embodiment of an enhanced anode showing metal-coated fibers dispersed throughout the active base anode material of FIG. 6.

Figure 8:
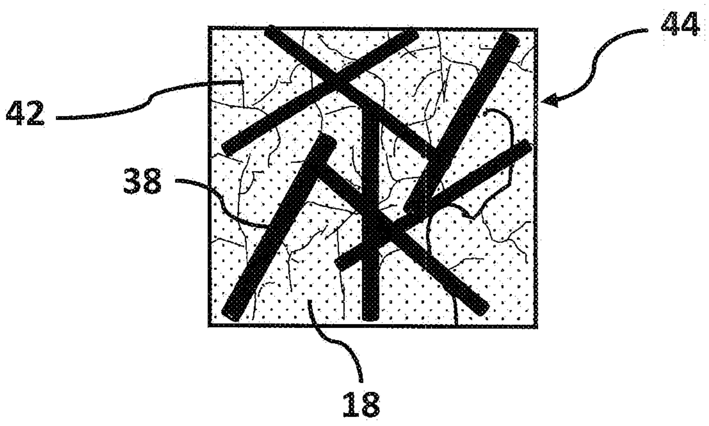

FIG. 8 is a representative depiction of a portion of an exemplary embodiment of an alternative enhanced anode showing metal-coated fibers and conductive filamentary structures dispersed throughout the active base anode material of FIG. 6.

Figure 9:
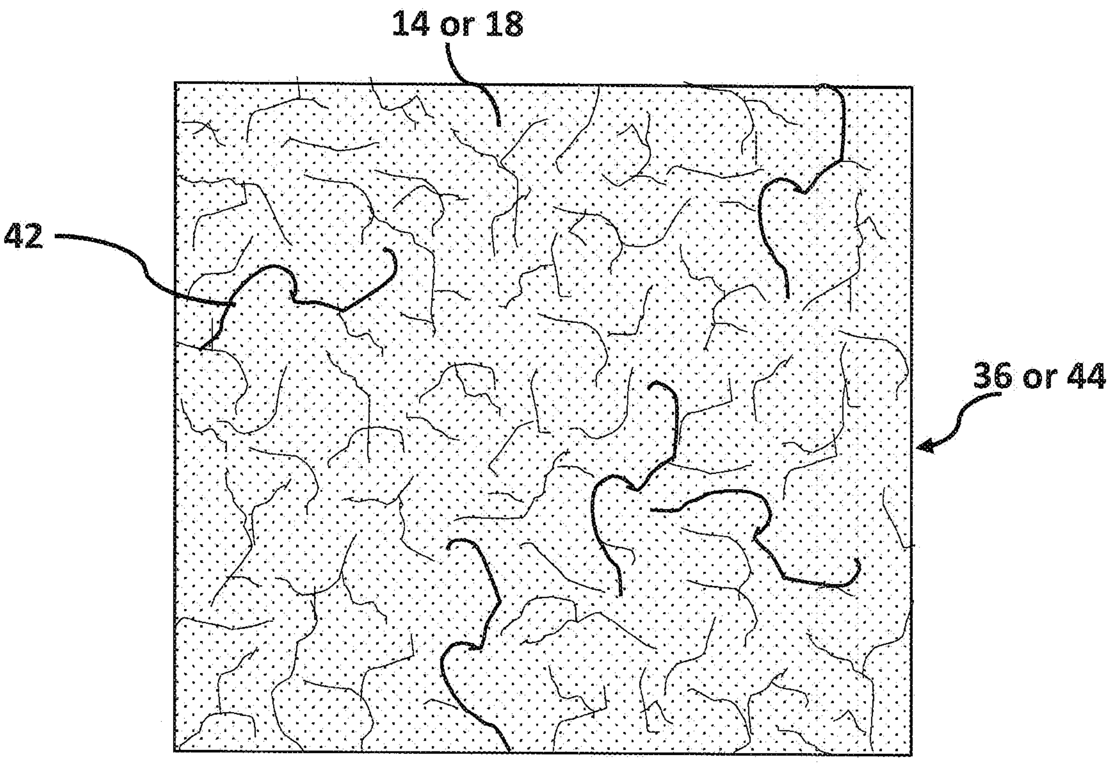

FIG. 9 is a representative depiction of a portion of an exemplary embodiment of an alternative enhanced electrode (anode or cathode) showing conductive filamentary structures dispersed throughout the base electrode material.

Figure 10:
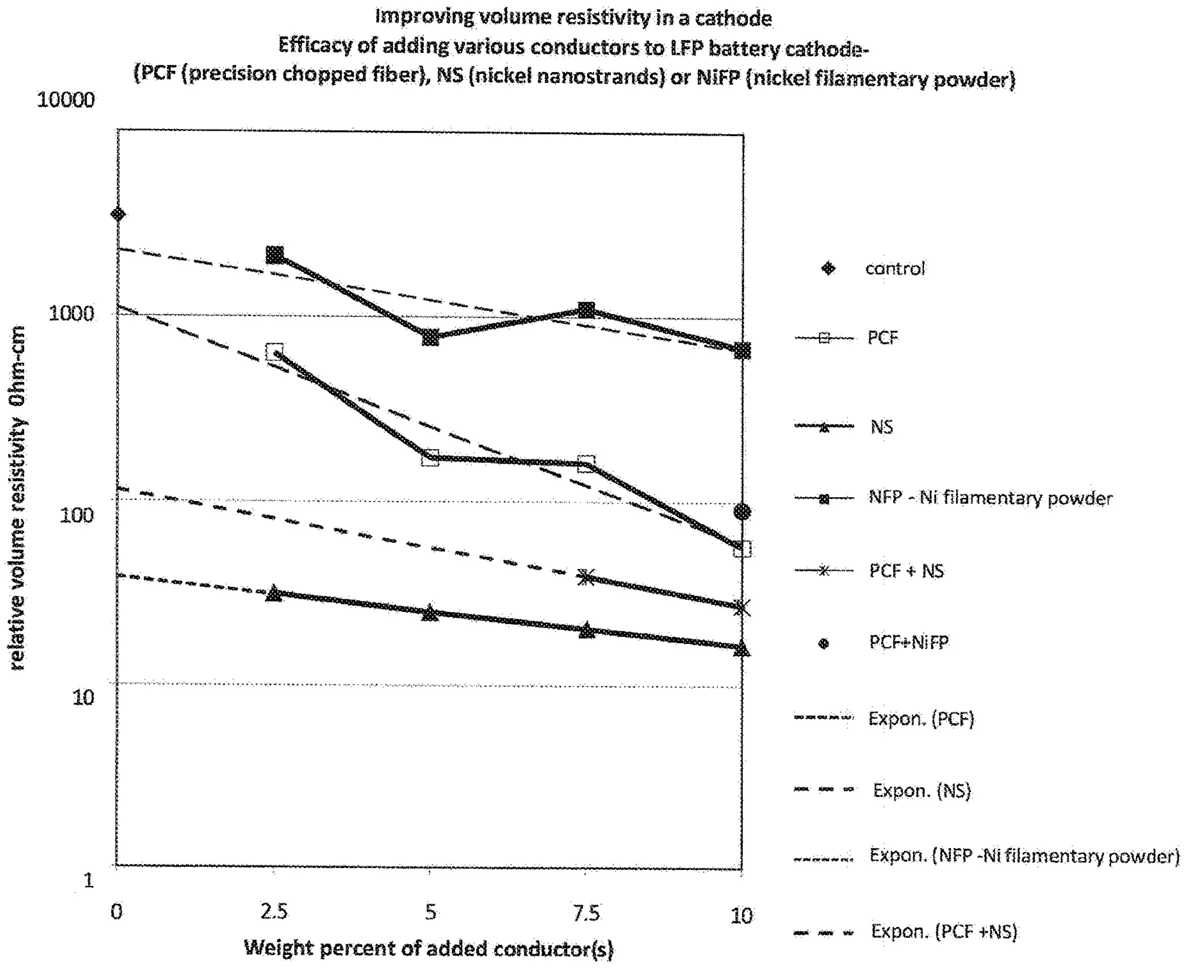

FIG. 10 is a chart depicting data regarding improving volume resistivity in a cathode by adding various conductors into an LFP battery cathode.

Figure 11:
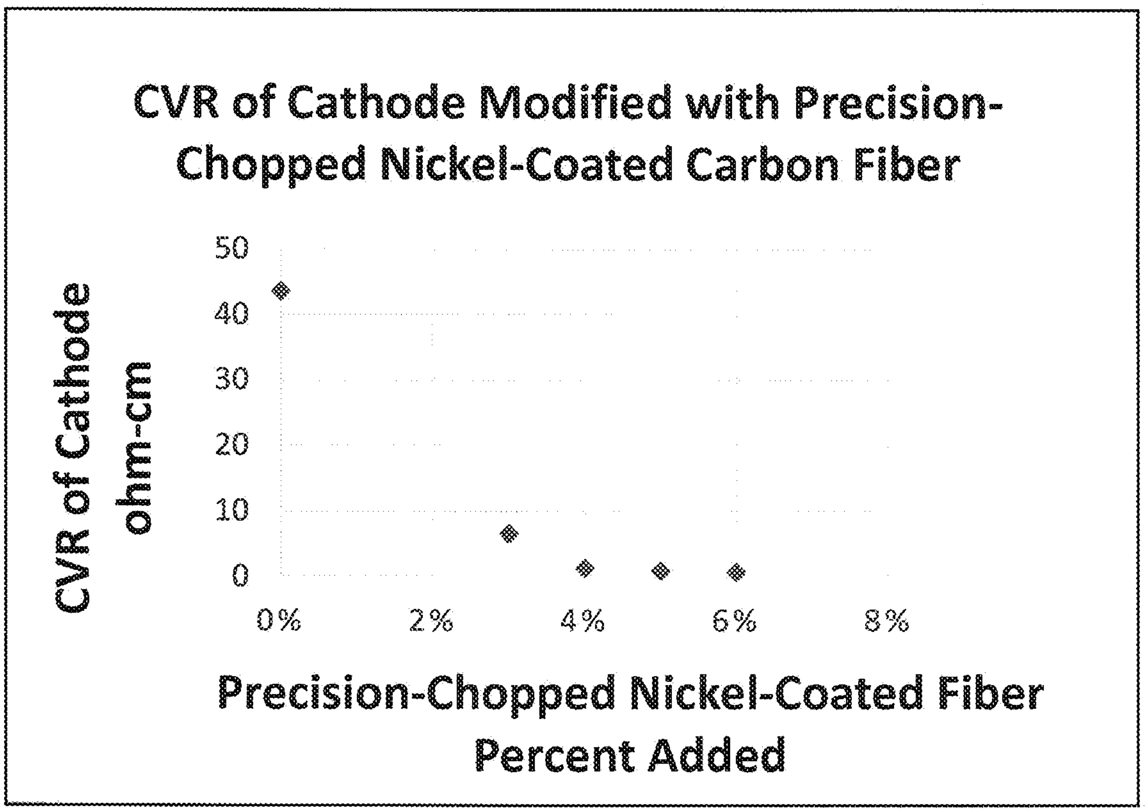

FIG. 11 is a graph titled "CVR of Cathode Modified with Precision-Chopped Nickel-Coated-Carbon fiber" depicting a visual representation of how the CVR (composite volume resistance) of the cathode changes with different selected percentages of nickel-coated fiber added into the active material of the cathode.

REFERENCE NUMERALS

| | |
|---|---|
| lithium-ion battery or battery 10 | standard cathode or cathode 12 |
| active base cathode material 14 | standard anode or anode 16 |
| active base anode material 18 | electrolyte 20 |
| separation barrier 22 | anode current collector foil 24 |
| cathode current collector foil 26 | battery housing 28 |
| schematic flow path 30 | lithium ions 32 |
| | enhanced cathode 36 |
| metal-coated fibers 38 | |
| conductive filamentary structures 42 | enhanced anode 44 |
| Arrow A (discharging direction) | Dashed Arrow B (discharging direction) |
| Arrow C (charging direction) | Dashed Arrow D (charging direction) |

DETAILED DESCRIPTION OF THE INVENTION

The exemplary embodiments of the present disclosure will be best understood by reference to the drawings, wherein like parts are designated by like numerals throughout. It will be readily understood that the components of the exemplary embodiments of the present invention, as generally described and illustrated in the figures and examples herein, could be arranged and designed in a wide variety of different arrangements. Thus, the following more detailed description of the exemplary embodiments, as represented in the figures and examples, is not intended to limit the scope of the invention, as claimed, but is merely representative of exemplary embodiments of the disclosure.

This detailed description, with reference to the drawings, describes a representative rechargeable lithium-ion battery 10 as known in the prior art that operates with a standard cathode 12 made of an active base cathode material 14 and a standard anode 16 made of an active base anode material 18. The exemplary embodiments of the present invention comprise modified electrodes with increased conductive that separately or together may be components of an enhanced battery.

Turning to FIG. 1, a representative rechargeable lithium-ion battery 10 as known in the prior art is depicted schematically. The lithium-ion battery 10 comprises the standard cathode 12 made of the active base cathode material 14, the standard anode 16 made of the active base anode material 18, an electrolyte 20, a separation barrier 22, an anode current collector foil 24, and a cathode current collector foil 26 encased within a battery housing 28. The active base cathode material 14 may be any of many cathode compounds known to be of use in batteries; however, for the purposes of this description, the battery 10 is a lithium-ion battery 10 and exemplary active base cathode materials 14 may include lithium iron phosphate (LFP) and the lithium nickel manganese cobalt oxide (NMC) and any other cathode material used in lithium-ion batteries. The active base anode material 14 may be any of the anode materials known to be of use in batteries; however, for the purposes of this description, the battery 10 is a lithium-ion battery 10 and exemplary active base anode materials 14 may include carbon power, graphite powder, and any other cathode material used in lithium-ion batteries. Such compounds also contain a small amount of a polymer used as a binder. Also, the most used electrolyte 20 in lithium-ion batteries 10 is lithium salt, such as $LiPF_6$ in an organic solution. The key role of electrolyte 20 is transporting positive lithium ions (cations) between the cathode 12 and anode 16.

The battery 10 operates to transport electrons through the system of components. In FIG. 1, in the discharging mode the electron transport starts with the anode current collector foil 24, then through the anode foil/active mass interface to the anode active mass (in this case, the standard anode 16). The discharging direction of electron flow (shown by schematic flow path 30) is shown generally at Arrow A from negative to positive. Positively charged lithium ions 32 travel within the electrolyte 20 (in this case, the lithium accepting an electron at the standard anode 16 when charging), that electron and lithium (of the lithium ions 32) pass across the separation barrier 22 (as shown by Dashed Arrows B) to the standard cathode 12. Separation of the electron from the lithium (of the lithium ions 32) occurs in the standard cathode 12. The electron is transported through the cathode active mass (standard cathode 12) to the active mass/foil interface then moves the electrons out of the cathode current collector foil 26 to the device it services.

FIG. 2 shows the battery 10 of FIG. 1 during charging. The charging direction of electron flow (shown by schematic flow path 30) is reversed as shown generally at Arrow C from positive to negative. Positively charged lithium ions 32 travel within the electrolyte 20 from the standard cathode 12 passing across the separation barrier 22 (as shown by Dashed Arrows D) to the standard anode 14.

Significant improvement in the conductivity of either the anode or the cathode or both leads to lower resistivity, not only across or through the respective cathodic or anodic film, but also generally across the entire battery cell. As a result, a lower resistance leads to higher voltage to move a given current or move a higher current at a given voltage. This, in turn, leads to faster charging or discharging, or the ability to move an electron at greater ease through thicker films, thus increasing capacity. There will also be a decrease in joule heating, with a corresponding reduction in temperature and in energy loss. A decrease in operating temperature also results in a more efficient and safer battery.

Described in this disclosure are exemplary conductive additives 34 (see FIGS. 4, 5, 7, 8, and 9) for the anode 16 and the cathode 12 that significantly improve conductivity enhancing the performance of these components 12, 16 and the battery 10 within which they are used. By dispersing some of these exemplary additives 34 within the active base cathode material 14 and/or the active base anode material 18, the resultant, enhanced cathode 36 and/or enhanced anode 44 exhibit increased conductivity and ion transport within the battery system is facilitated. It is also postulated that the non-carbon surfaces of the highly conductive anode additives may inhibit SEI growth.

FIG. 3 is a representative depiction of a portion of an exemplary embodiment of cathode 12 as generally known in the prior art showing an active base cathode material 14 from which the cathode 12 is made. As noted above, the active base cathode material 14 may be any of many cathode compounds known to be of use in batteries.

An exemplary embodiment of an enhanced cathode 36 showing metal-coated fibers 38 dispersed throughout the active base cathode material 14 is depicted in FIG. 4. The depiction of FIG. 4 is not drawn to scale, nor does it suggest any specific level of loading. Rather, the depiction is merely intended to give context to the dispersion of metal-coated fibers 38 within the active base cathode material 14.

FIG. 5, a magnification compared to FIG. 4, depicts an alternative exemplary embodiment of the enhanced cathode 36 showing metal-coated fibers 38 and conductive filamentary structures 42 (which are high aspect ratio conductors 40) dispersed throughout the active base cathode material 14. The structures of the conductive filamentary structures additive 42 are smaller than the metal coated fibers 38 in at least one material physical aspect, such as diameter, weight, or volume and may also exhibit branching. The electrical conductivity between the conductive metal-coated fibers 38 is further enhanced by the addition of the conductive filamentary structures additive 42. Again, the depiction of FIG. 5 is not drawn to scale, nor does it suggest any specific level of loading. Rather, the depiction is merely intended to give context to the dispersion of metal-coated fibers 38 and conductive filamentary structures additive 42 within the active base cathode material 14.

FIG. 6 is a representative depiction of a portion of an exemplary embodiment of an anode 16 as generally known in the prior art showing an active base anode material 18 from which the anode 16 is made. As noted above, the active base anode material 16 may be any of the active anode materials known to be of use in batteries.

An exemplary embodiment of an enhanced anode 44 showing metal-coated fibers 38 dispersed throughout the active base anode material 18 is depicted in FIG. 7. The depiction of FIG. 7 is not drawn to scale, nor does it suggest any specific level of loading. Rather, the depiction is merely intended to give context to the dispersion of metal-coated fibers 38 within the active base anode material 18.

FIG. 8, a magnification compared to FIG. 4, depicts an exemplary embodiment of an alternative enhanced anode 44 showing metal-coated fibers 38 and conductive filamentary structures 42 (which are high aspect ratio conductors 40) dispersed throughout the active base anode material 18. The structures of the conductive filamentary structures additive 42 are smaller than the metal coated fibers 38 in at least one material physical aspect, such as diameter, weight, or volume and may also exhibit branching. The electrical conductivity between the conductive metal-coated fibers 38 is further enhanced by the addition of conductive filamentary structures additive 42.

FIG. 9, a representative schematic depiction of a portion of an exemplary embodiment of an alternative enhanced electrode (anode or cathode), shows conductive filamentary structures additive 42 dispersed throughout the active base electrode material. Being schematic, FIG. 9 serves a dual function in that the depiction is the same for an exemplary active base cathode material 14 as for an exemplary active base anode material 18 even though such active materials likely differ from one another. Accordingly, reference numbers are provided in the alternative for cathode-related and anode-related references. The purpose of FIG. 9 is to clarify that conductive filamentary structures additive 42 may be used alone as conductive additive or may be used in combination with metal-coated fiber additive 38 as depicted in FIGS. 5 and 8.

The chart of FIG. 10 shows data regarding improving volume resistivity in a cathode by adding various conductors as additives; namely, PCF (precision chopped fiber) alone, nanostrands alone, NFP or NiFP (nickel filamentary power such as Type 255 powder (and its derivatives)) alone, PCF with nanostrands, and PCF with NiFP into an LFP battery cathode.

The graph of FIG. 11 is titled "CVR of Cathode Modified with Nickel-Coated Carbon fiber" and depicts how the CVR (composite volume resistance) of the cathode (commonly referred to as volume resistivity) significantly decreases with different selected percentages of nickel-coated fiber added into the active material of the cathode. It is well known that volume resistivity measures a material's inherent electrical resistance. Hence, the lower the volume resistivity of a cathode modified by adding an additive to the base cathode material, the lower the electrical resistance in the cathode becomes.

For purposes of this disclosure PCF comprises metal-coated precision chopped fiber wherein the metal may be either nickel or aluminum and the nickel coating may be of any known type including coatings made by vacuum processes (physical vapor deposition (PVD), sputtering, evaporation, etc.), wet chemistry processes (electroplating, electroless plating) and Chemical Vapor Deposition (CVD) and the aluminum coating may be of any known type including coatings made by vacuum processes (physical vapor deposition (PVD), sputtering, evaporation, etc.) and Chemical Vapor Deposition (CVD).

Though PCF, nanostrands, and NiFP are relatively new conductive materials, the inventor of the present invention has determined during conductive polymer (paints, adhesives, and plastics) work that 1) precision chopped fibers (PCF) are a very effective conductive additive, 2) Nanostrands are even more effective conductors, 3) filamentary nickel powders (NiFP) are marginally effective on their own, and 4) the positive effect of combining the fibers as "logs" and either the filamentary powders or nanostrands as "tumbleweeds" or the fibers and particles as "highways and byways". In these combined applications, the nanostrands are a much better "tumbleweeds", but the filamentary powders are more than adequate.

Nevertheless, making polymers conductive by dispersing the above-mentioned additives within polymers differs markedly from enhancing conductivity in battery systems. Batteries present a much different electron transport phenomenon, one wherein there is a very high-power direct current experienced both during charging and discharging cycles. In the case of batteries, the need to provide a high current capacity through the high aspect ratio of fibers and multiplicity of electronic pathways through logs and tumbleweeds becomes even more essential to reducing DC resistance and AC impedance.

To demonstrate these concepts in a battery cathode, a master batch of LFP cathode material was mixed. The mixture was formed into cathode films at 2.5%, 5%, 7.5% and 10% for precision chopped fiber (PCF), nanostrands (NS), and commercial nickel filamentary powder (NiFP). Then a 5% PCF mixture was loaded with 2.5% and 5% NS, and with 5% and 10% NiFP. The weight and through-thickness resistance of each film was measured. Then the chart provided as FIG. 10 was prepared as a compilation of graphs formulated from the data derived showing the films compared as a function of their additives and loading amount and normalizing these results to indicate how much of an improvement each one gives over the others. Examples #7 and #8, discussed below, are related to the results shown in the chart provided in FIG. 10. Comparing the data shows that the results are not identical, because the results are derived by different methods; however, the data values do correlate.

The following observations may be drawn from FIG. 10 and known cost and manufacturing considerations. NiFP alone yields very little improvement, but such marginal improvement may be viable for some batteries. PCF alone, which is both manufacturable and affordable, yields a decent improvement. Though relatively expensive, NS alone works best, but a commercial manufacturing process for large amounts of NS is still in development. The logs and tumbleweeds network using either NiFP or NS in conjunction with PCF works well; however, PCF+NS clearly works better.

Consequently, because the above-mentioned additives provide enhanced conductivity universally in all polymers within which dispersal is possible, the data represented in FIG. 10 evidences enhanced conductivity in all batteries within which the additives are dispersible and non-corrosively compatible.

EXAMPLES

Following are a few representative examples that demonstrate the concepts and advancements disclosed herein:

Fiber Choice (Examples 1 Through 3)

Example #1—Nickel-coated carbon fiber in a cathode. A nickel-coated carbon fiber (7 microns diameter, with 40% nickel coating, or 0.25 micron thick, precision chopped to 0.50 mm) provided excellent conductivity in the cathode. Adding 2% by weight of the described fiber moved the through thickness resistance of a 100 microns film from 3.5 ohms (no fiber) down to 1.5 ohms (2% fiber). However, the lithium-ion NMC coin cells made from these films would not cycle. It was discovered that the cell corroded at 3.8 volts, before reaching the 4.2 volts operating condition. This is because the half-cell potential of nickel and lithium is 3.8 volts. However, this did demonstrate that the conductivity could be greatly improved and suggested that the nickel-coated fiber should work in systems that remain below about three and a half volts (see LFP cathode examples below).

Example #2—Aluminum-coated fiber in a cathode and a coin cell. The half-cell potential of aluminum and lithium is 4.7 volts. Thus, an aluminum-coated fiber should survive a cathode having a 4.2-volt operating voltage lithium. In this case, a 0.2-micron coating of aluminum was plated over a 0.1-micron coating of nickel on carbon fiber. The dually coated fiber was chopped to 0.50 mm length. When this fiber was added to the cathode at 3%, by weight, the cell was able to successfully cycle for about a week, before the underlying nickel entered into the reaction. When these cathode films were produced, the standard cathode (made of an active base cathode material) was 130 microns thick and the fiber-loaded cathode (active base cathode material metal-coated fiber loaded) was 165 microns thick. This could likely be because the added fibers added support and drag to pull a slightly thicker film. The table below compares the thickness, resistance, voltage, and capacity of these two cells. (Each value is the average of three samples).

| film | Thickness microns | Resistance | Voltage | Capacity mAhr |
|---|---|---|---|---|
| standard | 130 | 0.86 ohm | 3.53 V | 3.29 |
| 2% Al on Ni on carbon fiber | 165 | 0.86 ohm | 3.76 V | 4.05 |
| difference | +27% | same | same | +23% |

Note that the fiber loaded film is 27% thicker than the standard film but exhibits the same resistance indicating lower resistivity. The lower resistivity resulted in a higher voltage. The implication of the higher voltage would manifest a higher rate. As the fiber loaded cathode was 27% thicker, the capacity of the fiber-loaded film was increased by 23%.

Example #3—Process of coating various fibers with CVD aluminum. Many of the previously mentioned fibers have been coated by an aluminum CVD (chemical vapor deposition) process, precision chopped to 0.5 mm and added to the cathode. Fiber examples include (but are not limited to) silicon carbide, borosilicate, quartz, mineral (basalt), surface modified carbon and organic (aramid-Kevlar). In each of these cases, the addition of 1% to 5% of the precision chopped, aluminum-CVD coated fiber improved the conductivity of the coating by values similar to that of Example #1 above. Each of these fibers will add certain advantages, or disadvantages, unique to that particular fiber, but they all work to improve the conductivity of the cathode.

Cathodes (Example 4)

Example #4—Aluminum-coated fibers precision chopped to 0.5 mm. These coated fibers were dispersed into a standard cathode mix at 3% by weight (always reserving a portion of the mix for a control). This was repeated several times, the largest variable being a batch to batch or fiber type variation in the aluminum-coated fiber conductivity.

Films were extruded onto aluminum foil with a doctor blade, the height of the blade being adjusted to achieve a consistent film thickness and weight, depending on the desired thickness and the solvent-to-solids ratio of the mix. After drying, the uncalendared films were tested for volume resistivity per ASTM Method D2739. The table below reports several of these comparative batches.

| Sample | Volume resistivity control ohm-cm | Volume resistivity modified ohm-cm | Improvement |
|---|---|---|---|
| A | 1750 | 615 | 2.8 x |
| B | 2215 | 687 | 3.2 x |
| C | 1617 | 413 | 3.9 x |
| D | 2175 | 790 | 2.8 x |

With sample set D, the samples were calendared and measured for composite Volume Resistivity (CVR) and interface resistivity (IR).

| | CVR (ohm-cm) | IR (ohm-cm) |
|---|---|---|
| control | 15.4 | 1.06 |
| modified | 12.5 | 0.50 |
| improvement | 1.2 x | 2.1 x |

Example #5—Higher fiber loading in cathode. A standard cathode mixture was loaded with 3%, 4%, 5% and 6% of 0.5 mm precision chopped, nickel-coated fiber having a 40% nickel coating (250 nm thickness). Attempts to mix above 6% resulted in poorer dispersion. However, the following table illustrated the improvement in through thickness volume resistivity when films of equal thickness were pulled from these mixtures.

Volume resistivity of cathode films modified with precision-chopped nickel-coated carbon fiber at 40% nickel and 0.5 mm length.

| Weight percent of fiber added | Volume resistivity ohm-cm |
|---|---|
| 0% (standard film) | 43.6 |
| 3% | 6.55 |
| 4% | 1.30 |
| 5% | 0.90 |
| 6% | 0.69 |

This dramatic reduction in volume resistivity by adding and increasing the weight percent of nickel-coated fiber, as set forth in the chart above, is visually depicted in the graph of FIG. 11. The volume resistivity decreases significantly as the weight percent of nickel-coated carbon fiber added increases.

Anodes (Examples 6 and 7)

Example #6—Anode with copper-coated carbon fibers. Copper is more conductive than nickel, so copper-coated carbon fiber is more conductive than nickel-coated carbon fiber. Because the current collector of the anode is copper foil, copper-coated carbon fibers may be a viable candidate for anode improvement. In this example, up to 8% of a copper-coated carbon fiber was added to the anode. The copper coating is 40% by weight on an AS4 fiber. The copper coated carbon fiber was obtained from Technical Fiber Products of Schenectady, New York, and precision chopped to 0.50 mm length. The CVR of the resulting anode was reduced from 244 mohms to 56 mohms, or a 435% improvement in the CVR, while the IR was reduced from 27 mohms to 8 mohms, a 337% improvement. As a result, the voltage of the standard cell at 10 C discharge rate was 3.5V, while the voltage of the PCF copper treated cell was 3.5V at 20 C discharge rate, indicating that the treated cell discharged twice the current at the same voltage.

Example #7—Filamentary branching structures. Nickel powders produced by chemical vapor decomposition may be produced in two distinct geometrical classes; either spherical (type 1 powders) or filamentary (type 2 powders). Type 1 powders are of little use in increasing conductivity until loadings are exceptionally high, due to the need for the particles to come in close contact to each other. However, the filamentary powders become conductive at lower loadings due to the higher aspect ratio, and in part due to filamentary powders generally exhibiting some degree of branching. These powders in larger diameter format (generally above one micron in diameter of the main branch) are available through Vale or Novamet, notably as Type 255 powder (and its derivatives). Nanostrands are a filamentary branching metal having a smaller diameter with more extensive branching. Nanostrands are available from The Conductive Group, Heber City, Utah.

The type 255 powder alone did little to increase the conductivity of the system. However, the nanostrands did show a significant increase in the conductivity of the anode mix.

Of interest are the combinations of the NiPCF fibers (Nickel-coated, precision-chopped fibers) with the filamentary branching structures, forming a "logs and tumbleweeds" network.

The following table compares the CVR and IR of standard anode films to that of 5% NiPCF, 5% type 255, 5% nanostrands, and 5%+5% NiPCF/255 and 5%+5% NiPCF/nanostrands:

| Additive | CVR (ohm-cm) | Percent improvement compared to standard | IR (ohm-cm) | Percent improvement compared to standard |
|---|---|---|---|---|
| Standard - carbon powder only | 0.77 | 0% | 0.60 | 0% |
| NiPCF fiber 5% | 0.91 | −15% | 0.57 | +6% |
| Type 255 powder (est.) | 1.0 | −29% | 0.40 | +50% |
| Nanostrands (est.) | 0.77 | 0% | 0.28 | +115% |
| NiPCF plus type 255 | 0.65 | +19% | 0.28 | +115% |
| NiPCF plus nanostrands | 0.66 | +18% | 0.11 | +447% |

As the standard anode is already fairly conductive, it was postulated that the effect if these nickel bearing conductors will not be as dramatic as in the cathode. However, the efficacy of the NiPCF plus the nanostrands is of note. Also, adding just nickel-coated PCF shows a degree of efficacy. Hence, armed with this disclosure, it should be evident to one skilled in the art that combining nanostrands with the copper PCF of Example #6 will yield a significantly better result.

It is noted that the CVR of individual additives seem to not be very effective, but the combinations do move the CVR somewhat. They all have some effect on the IR, some very significant. This is likely because none of the additives individually are much more conductive than the carbon powder. But the "logs and tumbleweeds" provides a more complex electron transport opportunity. The IR, the interfacial resistance, suggests that the combinations of additives multiple paths directly to the underlying foil across the ever-present polymer binder barrier. Calendaring likely provides additional physical impression of the conductors into the foil.

In the anode where the carbon particles are tens of microns in size, it has been observed that the filamentary branching structures (tumbleweeds) not only provide a multiplicity of high aspect ratio paths to the nickel-coated fibers (logs), but they also tend to lay on, or tend to touch the carbon particles in multiple places (each such touching hereinafter being referred to as a "touch point"). With the more open and branched nanostrands, they tend to wrap themselves around and envelop the carbon particles, like a spider web or net, creating a nanonet and exhibiting a multiplicity of touch points. It is this fashion of multiple touching and nanonetting that adds significantly more conduction opportunities. It becomes a "logs and tumbleweeds and nanonet" model and is structured uniquely in its ability to collect current at higher rates, higher amperages, and lower voltages.

Example #8—Cathodes with branched filamentary structures. As these branching filamentary conductors are made of nickel, they can only be applied to LFP cells. Cathodes were made with no additives (control sample) and with NiPCF (chopped to a shorter 0.25 mm, refer to Example #9 below), with the branched Type 255 powder (larger diameter and less branching) alone, with the nanostrands (smaller diameter, more branching) alone, and with combinations thereof, as follows. The volume resistivity of each was reported (volume resistivity is similar, but not the same as CVR).

| PCF | Type 255 Powder | nanostrands | volume resistivity -mohm |
|---|---|---|---|
| PCF only | | | |
| none | none | none | 136 |
| 5% | none | none | 53 |
| 10% | none | none | 8.1 |
| Nanostrands only | | | |
| none | none | 2.5% | 1.3 |
| none | none | 5% | 1.2 |
| 255 Powder only | | | |
| none | 5% | none | 39 |
| none | 10% | none | 20 |
| PCF + nanostrands | | | |
| 5% | none | 2.5% | 0.4 |
| 5% | none | 2.5% screened | 3.1 |
| PCF + 255 Powder | | | |
| 5% | 5% | none | 21 |

Nanostrands demonstrate tremendous efficacy, both alone and with PCF. Nanostrands may be screened, such as through a 100 mesh.

Armed with this disclosure, one skilled in the art may surmise that the use of the copper-coated PCF will yield better results, though they may not be nearly as dramatic, due to the extreme efficacy of nanostrands.

Example #9—PCF length. In some battery embodiments, depending on the type and makeup of the battery, 0.50 mm PCF may prove to be too long and penetrate the separator. There are two immediate solutions to this occurrence; 1) Implement a thicker separator or a double separator (which has been found to work) or 2) make the fiber shorter. As mentioned above, making the fiber shorter may require a greater loading to achieve the same CVR. The IR, however, is not affected as much. These concepts are shown in the following table:

| Fiber length | Fiber loading | CVR (ohm-cm) | IR (ohm-cm) |
|---|---|---|---|
| 0.50 mm | 5% | 50 | 4.1 |
| 0.25 mm | 5% | 70 | 4.2 |
| 0.25 mm | 7.5% | 52 | 4.0 |
| 0.25 mm | 10% | 52 | 4.2 |

Pouch Cell Batteries (Example 10)

Example #10—The example of a modified cathode is given in Example #6 above. Example #10 demonstrates the performance of two sets of lithium iron phosphate cells, one with a standard cathode and one with an additive loading of 5% by weight of nickel-coated PCF at 40% nickel and precision chopped to a 0.50 mm length. After a successful build and conditioning cycle, each of the cells were cycled to C/10 discharge rates to determine their capacities. Then each population was subjected to a series of increasing discharge rates as follows: C/2. 1C, 2C and 3C. This demonstrated that at any equivalent voltage, the nickel-coated PCF cells discharge 2.1 times faster than the standard cell, which implies that the treated cell will develop 2.1 times the power. To one skilled in the art, it should be recognized that, armed with this disclosure and according to Ohm's law, that the demonstrated increase in current at the same voltage (or increase in voltage at the same current, or reduction in resistance/impedance, both of which were also observed) leads to less Joule (resistive) heating, which will simultaneously return that energy to the battery for greater increased efficiency and a safer, lower operating temperature.

For exemplary methods or processes of the invention, the sequence and/or arrangement of steps described herein are illustrative and not restrictive. Accordingly, although steps of various processes or methods may be shown and described as being in a sequence or temporal arrangement, the steps of any such processes or methods are not limited to being carried out in any specific sequence or arrangement, absent an indication otherwise. Indeed, the steps in such processes or methods generally may be carried out in different sequences and arrangements while still falling within the scope of the present invention.

Additionally, any references to advantages, benefits, unexpected results, preferred materials, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under Section 112 is not intended. Additionally, it is not intended that the scope of patent protection afforded the present invention be defined by reading into any claim a limitation found herein that does not explicitly appear in the claim itself.

While specific embodiments and applications of the present invention have been described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

Those skilled in the art will appreciate that the present embodiments may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A battery cathode with enhanced electrical conductivity for use in a battery, the battery cathode comprising:

an active base cathode material comprising lithium iron phosphate; and at least one additive dispersed within the active base cathode material creating a dispersed mixture, the at least one additive comprising:

a first additive comprising a plurality of nickel-coated fibers having a diameter of from 3 microns to 20 microns, a nickel-coating thickness between 0.1 micron and 3 microns; and a fiber length of from 0.1 mm to 1.0 mm; and the first additive is dispersed into the active base cathode material in a loading weight range 1% of up to 15% of the active base cathode material.

2. The battery cathode of claim 1, wherein the battery cathode further comprises a second additive comprising conductive nickel-filamentary branching structures, the conductive nickel-filamentary branching structures are selected from the group consisting of branching nickel power and nickel nanostrands.

3. The battery cathode of claim 1, wherein each fiber of the plurality of nickel-coated fibers is selected from the group of materials consisting of carbon, pan ox, silica, quartz, silicates, alumina, aluminosilicates, borosilicates, glass, minerals, carbides, nitrides, borides, polymers, cellulose, inorganic fibers, and organic fibers which can be the same or different.

4. The battery cathode of claim 1, wherein the first additive comprises nickel-coated carbon fibers.

5. The battery cathode of claim 1, wherein the nickel-coated fibers comprise an electroplated coating.

6. The battery cathode of claim 1, wherein the nickel-coated fibers comprise an electroless plating coating.

7. The battery cathode of claim 1, wherein the nickel-coated fibers comprise a physical vapor deposition (PVD) coating.

8. The battery cathode of claim 1, wherein the nickel-coated fibers comprise a sputtered coating.

* * * * *